United States Patent
Fukunaga et al.

(10) Patent No.: US 6,867,511 B2
(45) Date of Patent: Mar. 15, 2005

(54) LINEAR OSCILLATORY ACTUATOR

(76) Inventors: Kazuyoshi Fukunaga, c/o Tokyo Denki University of 2-banchi, 2-chome, Kanda-Nishikicho, Chiyoda-ku, Tokyo (JP); Yasuhiro Fukui, c/o Tokyo Denki University of 2-banchi, 2-chome, Kanda-Nishikicho, Chiyoda-ku, Tokyo (JP)

(*) Notice: Subject to any disclaimer, the term of this patent is extended or adjusted under 35 U.S.C. 154(b) by 140 days.

(21) Appl. No.: 10/309,045

(22) Filed: Dec. 4, 2002

(65) Prior Publication Data

US 2003/0127918 A1 Jul. 10, 2003

(30) Foreign Application Priority Data

Jan. 4, 2002 (JP) ........................................ 2002-000045

(51) Int. Cl.⁷ .............................................. H02K 41/00
(52) U.S. Cl. ........................................... 310/12; 310/13
(58) Field of Search ............. 310/12, 13, 156.01–156.84, 310/36; 335/229, 302

(56) References Cited

U.S. PATENT DOCUMENTS

| | | | | |
|---|---|---|---|---|
| 4,363,980 A | * | 12/1982 | Petersen | .................. 310/15 |
| 5,434,549 A | * | 7/1995 | Hirabayashi et al. | ....... 335/229 |
| 5,896,076 A | * | 4/1999 | van Namen | ................. 335/229 |
| 5,947,155 A | * | 9/1999 | Miki et al. | ............. 137/625.65 |
| 6,501,357 B2 | * | 12/2002 | Petro | .......................... 335/229 |
| 6,667,677 B2 | * | 12/2003 | Yajima et al. | .............. 335/220 |

FOREIGN PATENT DOCUMENTS

JP          6-113522          4/1994

OTHER PUBLICATIONS

Daiki Ebihara, Member, Masaya Watada, Member (Musashi Institute of Technology), Takahiko Kasugai, Member (Futaba Electromagntic), Development and High–Power Design of Single–Winding Linear Oscillatory Actuator, T. IEE Japan, vol. 113–D, No. 1, '93, pp. 120–125.

* cited by examiner

Primary Examiner—Darren Schuberg
Assistant Examiner—Nguyen Hanh
(74) Attorney, Agent, or Firm—Oblon, Spivak, McClelland, Maier & Neustadt, P.C.

(57) ABSTRACT

A low cost, highly reliable linear oscillatory actuator comprising a yoke formed of magnetic material; an excitation coil wound on the yoke; and two permanent ring magnets arranged around the yoke and integrably set face-to-face on a common magnetic pole along the axial direction.

8 Claims, 4 Drawing Sheets

LINEAR OSCILLATORY ACTUATOR

BACKGROUND OF THE INVENTION

1. Field of the Invention

The present invention relates to a linear oscillatory actuator, and more particularly to a single-winding linear oscillatory actuator realizing a linear reciprocal movement of a mover at a large force in one direction and at a small force in the other direction.

2. Description of Background Art

It has been conventionally used a linear oscillatory actuator using a magnetic force in many mechanical instruments required to be driven in the linear reciprocal movement. It is known such a linear oscillatory actuator includes the moving coil type, moving iron-core type, and moving magnet type.

One of representative structures of the single-winding linear oscillatory actuator is that of the moving iron-core type combined with a spring for a mechanical operation (herein after referred to a "first example").

More particularly, the first example includes a single-winding excitation coil mounted on a stator core having substantially a "C"-shaped configuration. This structure also includes a spring for biasing in a predetermined direction. The spring is mounted on a mover of magnetic material arranged within the stator core. With this configuration a reciprocal movement can be achieved. The mover is attracted by a magnetic flux generated when a current is supplied to the excitation coil. The mover is returned to its initial position by the restoring force of the spring when the supply of the current to the excitation coil is stopped.

Another example of structure of a single-winding linear oscillatory actuator is disclosed in the article "The development of a single-winding linear oscillatory actuator and the high power design thereof"(The Transactions of The Institute of Electrical Engineers of Japan D, 1993, vol. 113-D, No. 1, pp. 120~125) (herein after referred to a "second example").

The second example is classified as a moving magnet type in which a single-winding excitation coil is mounted on a stator core having substantially a "C"-shaped configuration and a permanent axially magnetized magnet is sandwiched by salient poles. The mover is moved in a predetermined direction by the generation of alternately an attractive force and a repulsive force between the magnetic poles of the stator core and those of the mover. These forces are generated by supplying a current to the excitation coil. By reversing the direction of the current supplied to the excitation coil, the mover is moved in reverse direction due to the accompanying change in the magnetic pole generated in the stator core, and, thus, the mover can be reciprocated.

A third example of a single-winding linear oscillatory actuator is found in "A linear oscillatory actuator" disclosed in Japanese Laid-open Patent publication No. 113522/1994 (herein after referred to a "third example").

The linear oscillatory actuator of the third example is configured so that the mover coil is moved by a large force in one direction and returned to an initial position by a small force during a linear reciprocal movement thereof. This device has an actuator body classified as a moving coil type, and a control circuit for controlling so that a large current is supplied to the mover coil in the excitation thereof only when it moves the specified direction. Thus, it is possible to move the mover coil with a high thrust in the specified direction by supplying a large current thereto and to move the mover coil in a reverse direction with a low thrust by supplying a small current to the mover coil.

In the first example, it is possible to realize a single-winding linear oscillatory actuator moving in one direction with a large force and the other direction with a small force by deviating the balance between the magnitude of current and the restoring force of the spring. However, this device is limited since the reciprocal movement is restricted to a specific oscillatory frequency based upon the mechanical characteristics of the spring. In addition, because of the spring, the actuator of the first example is bulky and difficult to miniaturize.

In the second and third examples, it is possible to realize a desired reciprocal movement without using any spring by reversing the direction of the current supplied to the excitation coil. However, the degree of electric current control required in these actuators requires a complicated driving circuit and increases the manufacturing cost. In addition, the second example is designed with the assumption that it is moved with an equal thrust in either direction of reciprocation. This also results in reduced reliability.

What is required, as discovered by the present inventors, is a linear oscillatory actuator capable of minimization and high reliability.

SUMMARY OF THE INVENTION

The present invention provides a linear oscillatory actuator which can be manufactured at low cost and in a small size with a high reliability.

Generally, the present invention is directed to a linear oscillatory actuator which can be moved with a large force only in one direction during the reciprocal movement of the mover irrespective of the frequency of current.

In particular, the present invention is directed to a linear oscillatory actuator comprising a yoke formed of magnetic material; an excitation coil wound on the yoke; and two permanent magnets having a ring-shaped configuration and arranged around the yoke and integrated with being set face to face on same magnetic pole along the axial direction.

BRIEF DESCRIPTION OF THE DRAWINGS

Preferred embodiments of the present invention will be described with reference to the accompanied drawings in which.

DETAILED DESCRIPTION OF THE PREFERRED EMBODIMENTS

A linear oscillatory actuator of a first embodiment of the present invention will be described in detail with respect to FIG. 1 through FIG. 3.

Figure 1:
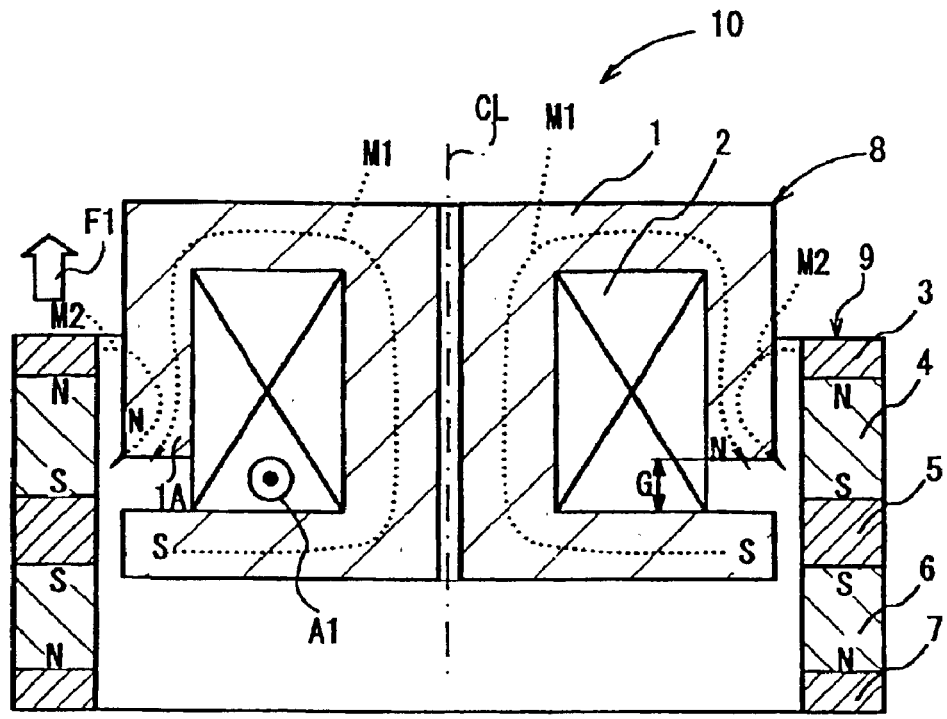
FIG. 1 is a cross-section view of a linear oscillatory actuator according to a first embodiment of the present invention showing a condition of a mover to which an upward force is applied.
Figure 2:
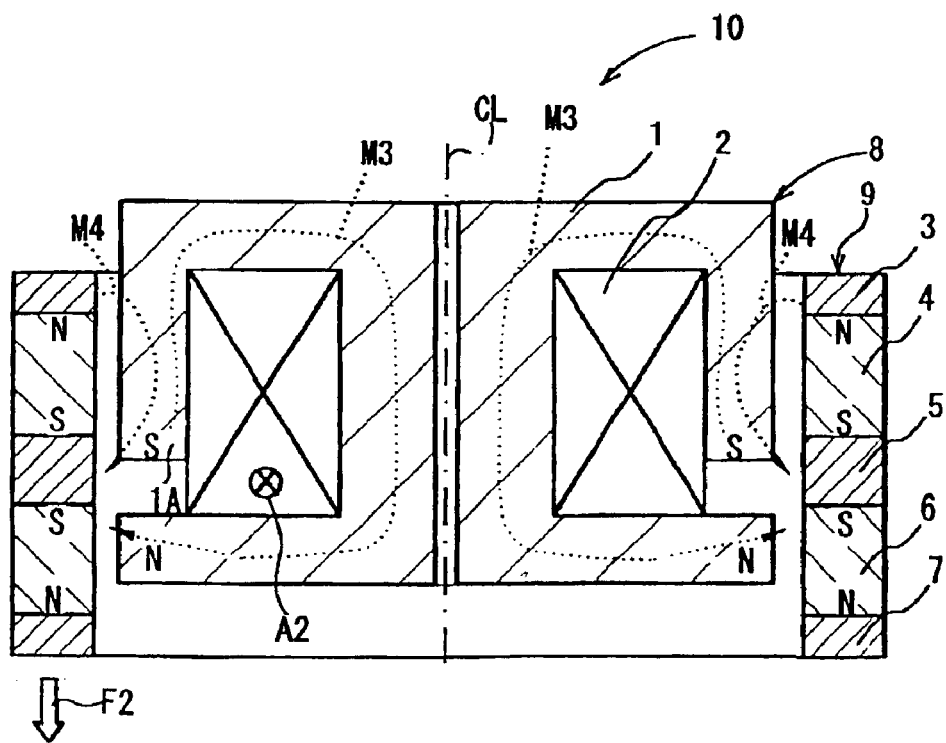
FIG. 2 is a cross-section view of a linear oscillatory actuator according to a first embodiment of the present invention showing a condition of a mover to which a downward force is applied.

FIG. 1 and FIG. 2 are cross-section views of the linear oscillatory actuator (hereinafter referred to the "actuator") 10 of the first embodiment.

As shown in FIG. 1, the center of the actuator 10 is constituted by a yoke 1 formed of magnetic material substantially as a cylinder on which an excitation coil 2 is wound. These yoke 1 and excitation coil 2 form a stator 8.

A main portion of the yoke 1 has a substantially "C"-shaped cross-section. However, according to the present invention, there is provided a magnetic reinforcing portion 1A which extends from the upper side of the outer circumferential portion toward the lower side of the yoke 1 and forms a gap "G" between the bottom end of the magnetic reinforcing portion 1A and the other end of the yoke 1. That is, according to the present invention, the cross-sectional configuration of the yoke 1 of magnetic material has a nonsymmetrical configuration along an oscillatory direction (an up and down direction in FIGS. 1 and 2) of a mover 9.

The mover 9 has a ring configuration and is arranged around the stator 8 with being opposed thereto.

The mover 9 comprises two permanent magnets 4 and 6 each having a ring configuration, and three inductors 3, 5 and 7 of metal adhered to the permanent magnets 4 and 6 for holding them. That is, the inductor 3 is arranged at the top of the permanent magnet 4, the inductor 7 at the bottom the permanent magnet 6, and the inductor 5 between the permanent magnets 4 and 6.

The permanent magnets 4 and 6 arranged along the axial direction thereof have a same configuration each other and are magnetized so that the "S" poles of them are opposed to each other via the inductor 5 therebetween. However, the axial lengths of the permanent magnets 4 and 6 may be differentiated.

As can be appreciated, the mover 9, as a whole, has a magnetic pole arrangement of N-S-N along its oscillatory direction. The magnetic pole arrangement of the mover 9 may be formed as S-N-S as a whole with the "N" poles of the permanent magnets 4 and 6 being opposed to each other.

As can be seen from above, the actuator 10 of the first embodiment has a structure of the line symmetry with respect to a center line CL and the ring-shaped mover 9 are adapted to be reciprocated up and down as shown in FIGS. 1 and 2. The mover 9 is arranged around the stator 8 so that the inner circumferential surfaces of the two permanent magnets 4 and 6 of the mover 9 are opposed to the outer circumferential surface of the magnetic reinforcing portion 1A of the stator 38.

The magnetic poles will be generated in the yoke 1 of magnetic material when a current is supplied to the excitation coil 2 of the actuator 10 of FIG. 1. Under the circumstances, the mover 9 is moved by the generation of attractive force and repulsive force between the magnetic poles of the stator yoke 1 and those of the permanent magnets 4 and 6 of the mover 9. In this case, since the configuration of the outer circumferential surface of the yoke 1 opposed to the mover 9 is not symmetric along the oscillatory direction of the mover 9, the attractive force and the repulsive force will be caused between the magnetic poles of the stator yoke 1 and those of the permanent magnets 4 and 6 of the mover 9 and act as followings.

In the condition of FIG. 1, when a current A1 is supplied to the excitation coil 2, a magnetic line of force M1 is generated in the yoke 1 of the stator 8. This magnetic line of force M1 generates the magnetic pole "N" at the bottom end of the magnetic reinforcing portion 1A extending downward from the upper side of the outer circumferential portion of the yoke 1 as well as the magnetic pole "S" at the other end of the outer circumferential portion of the yoke 1. On the other hand, there is always generated a magnetic line of force M2 passing the yoke 1 from the inductor 3 toward the inductor 5 by the permanent magnet 4 forming the mover 9.

Since the directions of these magnetic lines of force M1 and M2 are same, these magnetic lines of force M1 and M2 are superimposed each other and thus a strong "N" pole is generated at the bottom end of the magnetic reinforcing portion 1A.

The strong "N" pole generated at the bottom end of the magnetic reinforcing portion 1A strongly attracts the "S" pole near the inductor 5 and simultaneously repulses strongly the "N" pole near the inductor 3. On the other hand, the "S" pole generated at the bottom of the yoke 1 attracts the "N" pole near the inductor 7 and simultaneously repulses the "S" pole near the inductor 5. The mover 9 is thus moved upward in FIG. 1 by these attractive forces and the repulsive forces with a large force F1 and occupies a position of FIG. 2.

In the condition of FIG. 2, when a current A2 of a direction reverse to that of the current A1 is supplied to the excitation coil 2, a magnetic line of force M3 is generated in the yoke 1 of the stator 8. This magnetic line of force M3 generates the magnetic pole "S" at the bottom end of the magnetic reinforcing portion 1A extending downward from the top end of the outer circumferential portion of the yoke 1 as well as the magnetic pole "N" at the bottom end of the outer circumferential portion of the yoke 1. Simultaneously, magnetic line of force M4, substantially same as the magnetic line of force M2, passing the yoke 1 from the inductor 3 toward the inductor 5 is generated by the permanent magnet 4 forming the mover 9.

Since the directions of these magnetic lines of force M3 and M4 are opposite to each other, these magnetic lines of force M3 and M4 are cancelled out each other and thus a weak "S" pole is generated at the bottom end of the magnetic reinforcing portion 1A.

The weak "S" pole generated at the bottom end of the magnetic reinforcing portion 1A weakly repulses the "S" pole near the inductor 5 and simultaneously attracts weakly the "N" pole near the inductor 3. On the other hand, the "N" pole generated at the bottom of the yoke 1 repulses the "N" pole near the inductor 7 and simultaneously attracts the "S" pole near the inductor 5. The mover 9 s thus moved downward in FIG. 2 by these attractive forces and the repulsive forces with a small force F2 and occupies its initial position of FIG. 1.

The upward and downward motions of the mover 9 are thus repeated and the mover 9 continues the oscillation.

As described with reference to FIGS. 1 and 2, in the actuator 10 of the first embodiment, the direction of the magnetic line of force is changed in accordance with the direction of the current supplied to the excitation coil 2 and is influence by the magnetic line of force generated in the mover 9. As the result of which, one of the attractive and repulsive forces is increased and the other is reduced.

Accordingly, the mover can move in one direction of oscillation (the upward direction in FIGS. 1) with a force larger than in the other direction (the downward direction in FIG. 2).

Then a relation between the position of the mover 9 and the thrust acting on the mover 9 in the actuator 10 of the first invention of the present invention will a described based upon results obtained by a computer analysis of the 3D dynamic magnetic field (ELF/MAGIC) and results obtained by actual measurement of the prototype shown in FIG. 1.

The yoke 1 of the actuator 10 and inductors 3, 5 and 7 are made of soft magnetic iron SS400, and a rare earth-iron-boron permanent magnet (e.g. NEOMAX) is used for the permanent magnets 4 and 6 forming the mover 9. The excitation coil is formed by 585 turns of a copper wire of diameter of 0.5 mm. The outer diameter of the mover 9 is about 60 mm.

Figure 3:
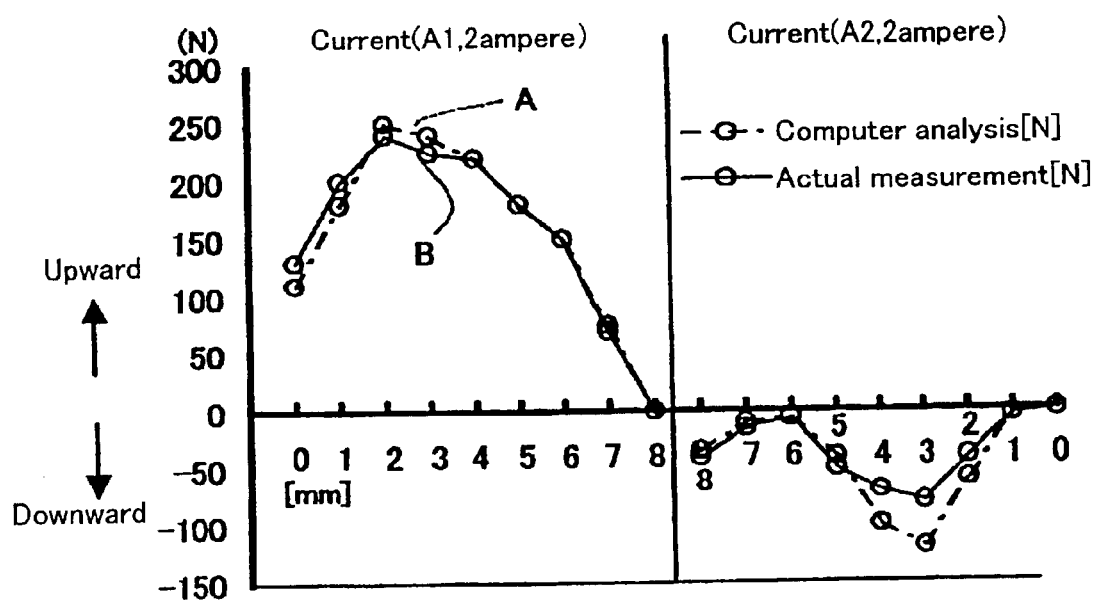
FIG. 3 is a graph showing the theoretical values and the experimental values of the thrust of a linear oscillatory actuator according to a first embodiment of the present invention.

The starting point (0 mm) in FIG. 3 corresponds to the initial position in FIG. 1 in which the mover 9 is stably stopped without supplying any current to the excitation coil. The mover 9 is moved upward to the uppermost position of 8 mm height from the starting point with supplying the current A1 of 2 ampere (A) to the excitation coil 2 as described with reference to FIG. 1.

Then the mover 9 is moved downward from its uppermost position of 8 mm height to its starting position of 0 mm height with supplying the current A2 of reversed direction of 2 ampere to the excitation coil 2. FIG. 3 shows the thrust in each position of 1 mm interval during the movement of the mover 9.

In FIG. 3, the abscissa denotes the position (mm) of the mover 9 and the ordinates denotes the thrust (N:Newton) acting on the mover 9. The result (a theoretical value) obtained by computer analysis of the thrust of the mover 9 in each position is represented by a characteristic curve A, and the result (an experimental value) obtained by actual measurement is represented by a characteristic value B.

It will be understood from FIG. 3 that either in the theoretical value or the experimental value, a high thrust is generated in a range of 0~8 mm during the upward movement of the mover 9, on the other hand, the thrust in the downward movement in a range of 8~0 mm is reduced to about ½ of that during upward movement.

In the first embodiment, although the current A1 in FIG. 1 and the current A2 in FIG. 2 should be differentiated in their directions, the magnitude of them is not required to be changed. Accordingly, the current control can be carried out by a simple input signal, for example, of a square wave, a sine wave and the like.

As can be seen from the description above, the actuator 10 of the first embodiment has a simple structure comprising one excitation coil 2 and can be easily assembled by arranging two permanent magnets 4 and 6 opposed to the magnetic reinforcing portion 1A extending from the top end of the yoke 1.

Since the presence of the magnetic reinforcing portion 1A makes the configuration of the outer circumferential surface of the yoke 1 nonsymmetrical, it is possible to drive the mover 9 with a high thrust only in one direction using a simple input signal such as a square wave or a sine wave.

In addition, because of simple structure of the actuator 10 and less number of parts forming the actuator, it is possible to improve the reliability of the actuator 10, to miniaturize the actuator 10, and to manufacture the actuator 10 at low cost.

Then a second embodiment of the linear oscillatory actuator of the present invention will be described with reference to FIG. 4. Same reference numerals are used in the second embodiment for designating same parts as those used in the first embodiment, and a duplicated description will be omitted.

Figure 4:
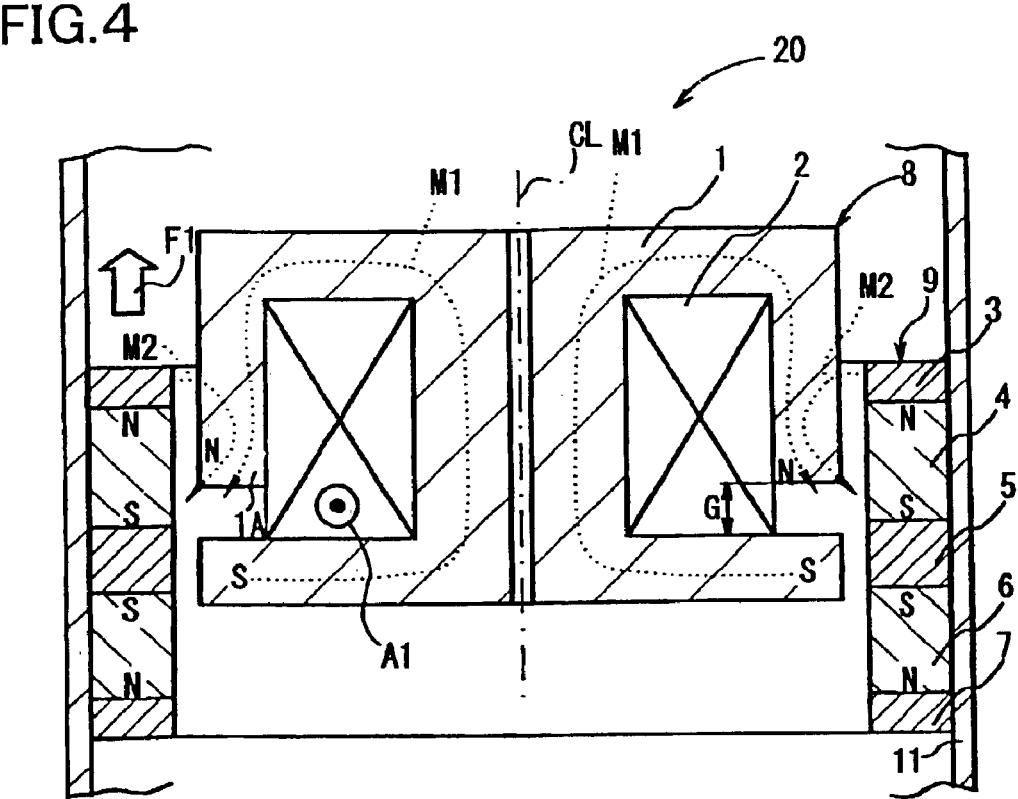
FIG. 4 is a cross-section view of a linear oscillatory actuator according to a second embodiment of the present invention.

FIG. 4 is a cross-section view of the linear oscillatory actuator (hereinafter referred to the "actuator") 20 of the second embodiment of the present invention.

The actuator 20 of this embodiment is substantially same as that of the first embodiment except for a provision of a ring-shaped support 11 around the mover 9 for slidably guiding the reciprocal movement of the mover 9.

According to the actuator 20 of the second embodiment, since the mover 9 is guided by the support 11 arranged outside the mover 9, it is possible to prevent the magnetic action between the stator 8 and the mover 9 from being interrupted by the support 11 and also possible to guide the mover 9 with a wide guiding area as compared with a support arranged between the stator 8 and the mover 9.

The material for forming the support 11 includes Teflon™, aluminum, brass, etc., and a linear bearing may be used as the support 11.

Then a third embodiment of the linear oscillatory actuator of the present invention will be described with reference to FIG. 5. Same reference numerals are used in the third embodiment for designating same parts as those used in the previous embodiments, and a duplicated description will be omitted.

Figure 5:
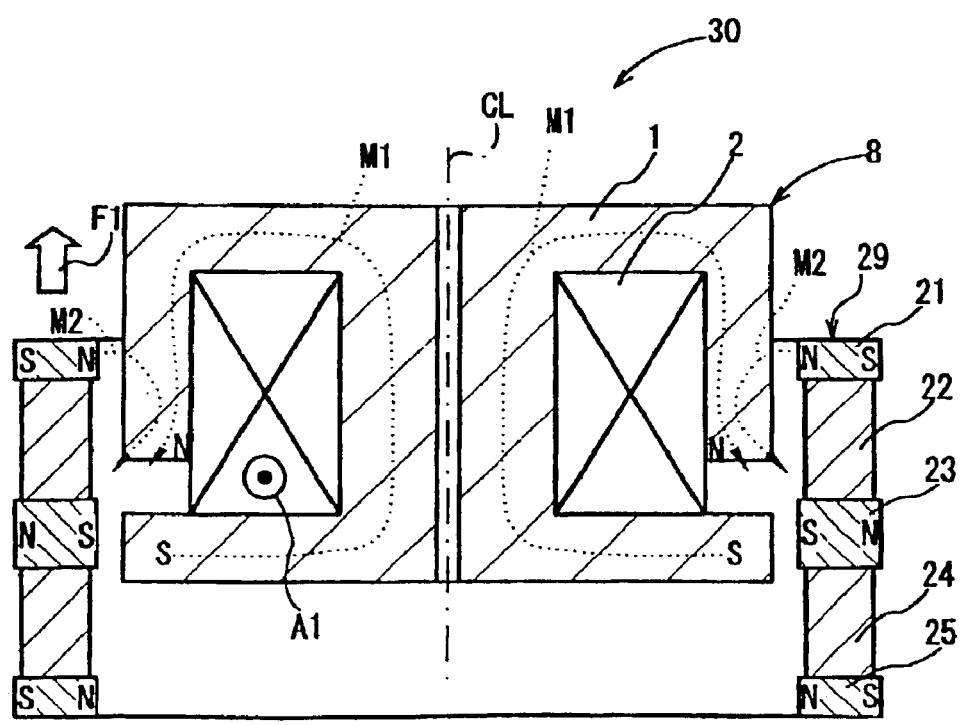
FIG. 5 is a cross-section view of a linear oscillatory actuator according to a third embodiment of the present invention.

FIG. 5 is a cross-section view of the linear oscillatory actuator (hereinafter referred to the "actuator") 30 of the third embodiment of the present invention.

The actuator 30 of this embodiment is substantially same as that of the first embodiment except that a mover 29 comprises three ring-shaped thin permanent magnets 21, 23 and 25 and two inductors 22 and 24 arranged between the magnets 21, 23 and 25 for connecting them each other. Each of the three magnets 21, 23 and 25 is magnetized so that a plane including the "N"-"S" pole crosses orthogonally the direction of the movement of the mover 9 as shown in FIG. 5.

Since the mover 29 including three permanent magnets 21, 23 and 25 is arranged around the yoke 1 and the mover 29 has, as a whole, a magnetic pole arrangement of N-S-N along its oscillatory direction, the actuator 30 of this embodiment has substantially same performance and characteristics as those of the actuator 10 of the first embodiment.

Then a fourth embodiment of the linear oscillatory actuator of the present invention will be described with reference to FIGS. 6 and 7.

Figure 6:
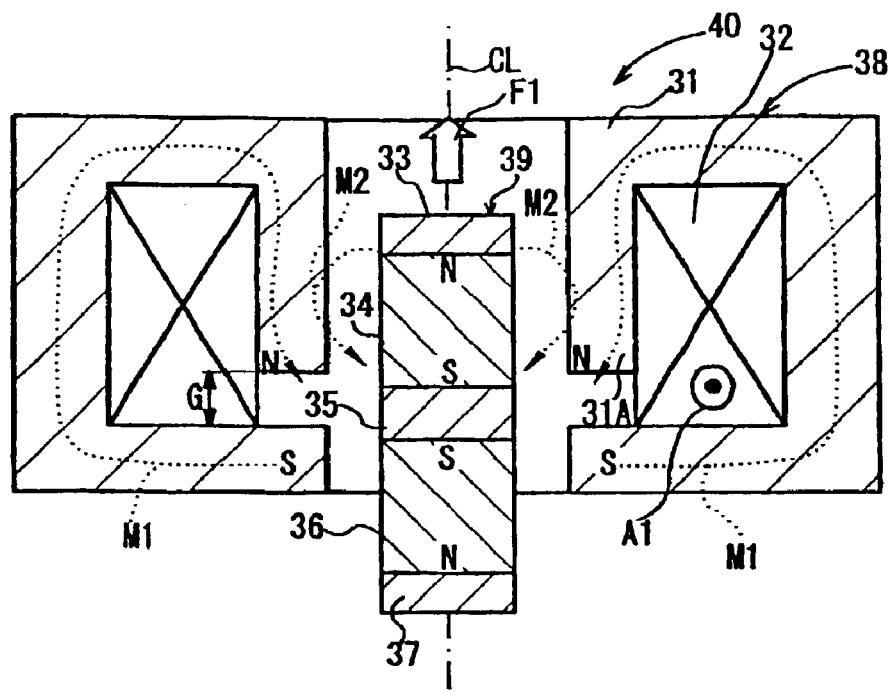
FIG. 6 is a cross-section view of a linear oscillatory actuator according to a fourth embodiment of the present invention showing a condition of a mover to which an upward force is applied.
Figure 7:
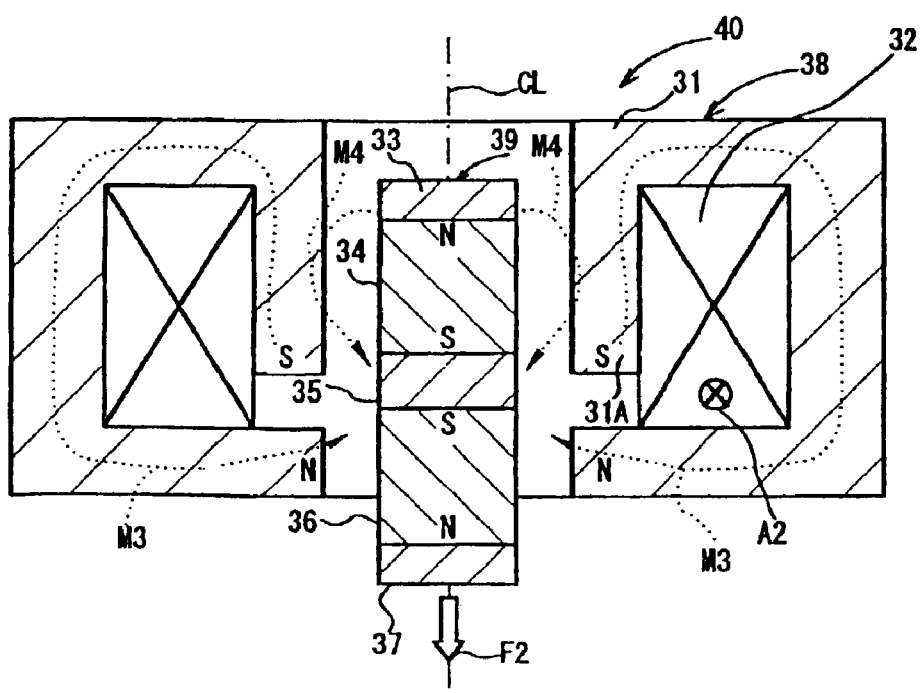
FIG. 7 is a cross-section view of a linear oscillatory actuator according to a fourth embodiment of the present invention showing a condition of a mover to which a downward force is applied.

FIGS. 6 and 7 are cross-section views of the linear oscillatory actuator (hereinafter referred to the "actuator") 40 of the fourth embodiment of the present invention.

As shown in FIG. 6, the outermost portion of the actuator 40 of this embodiment is formed by a ring-shaped yoke 31 of magnetic material on which an excitation coil 32 is wound. The yoke 31 and the excitation coil 32 constitute a stator 38.

A main portion of the yoke 31 has a substantially "C"-shaped cross-section. Similarly to the previous embodiments, there is provided a magnetic reinforcing portion 31A. However this magnetic reinforcing portion 31A extends from the upper side of the inner circumferential portion toward the lower side of the yoke 31 and forms a gap "G" between the bottom end of the magnetic reinforcing portion 31A and the other end of the yoke 31. That is, also according to this embodiment, the cross-sectional configuration of the yoke 31 has a non-symmetrical configuration along an oscillatory direction (an up and down direction in FIGS. 6 and 7) of a mover 39.

The mover 39 has a cylindrical configuration arranged within the stator 38 with being opposed thereto.

The mover 39 comprises two permanent magnets 34 and 36 each having a cylindrical configuration, and three inductors 33, 35 and 37 of metal adhered to the permanent magnets 34 and 36 for holding them. That is, the inductor 33 is arranged at the top of the permanent magnet 34, the inductor 37 at the bottom the permanent magnet 36, and the inductor 35 between the permanent magnets 34 and 36.

The permanent magnets 34 and 36 arranged along the axial direction thereof are magnetized so that the "S" poles of them are opposed to each other via the inductor 35 therebetween.

Accordingly, the mover 39, as a whole, has a magnetic pole arrangement of N-S-N along its oscillatory direction. However, the magnetic pole arrangement of the mover 39 may be formed as S-N-S as a whole.

As can be seen from above, the actuator 40 of the fourth embodiment has a structure of the line symmetry with respect to a center line CL and the cylindrical mover 39 are adapted to be reciprocated up and down as shown in FIGS. 6 and 7. The mover 39 is arranged within the stator 38 so that the outer circumferential surfaces of the two permanent magnets 34 and 36 of the mover 39 are opposed to the inner circumferential surface the magnetic reinforcing portion 31A of the stator 38.

The magnetic poles will be generated in the yoke 31 of magnetic material when a current is supplied to the excitation coil 32 of the actuator 40 of FIG. 6. Under the circumstances, the mover 39 is moved by the generation of attractive force and repulsive force between the magnetic poles of the stator yoke 31 and those of the permanent magnets 34 and 36 of the mover 39. In this case, since the configuration of the inner circumferential surface of the yoke 31 opposed to the mover 39 is not symmetric along the oscillatory direction of the mover 39, the attractive force and the repulsive force will be caused between the magnetic poles of the stator yoke 31 and those of the permanent magnets 34 and 36 of the mover 39 and act as followings.

In the condition of FIG. 6, when a current A1 is supplied to the excitation coil 32, a magnetic line of force M1 is generated in the yoke 31 of the stator 38. This magnetic line of force M1 generates the magnetic pole "N" at the bottom end of the magnetic reinforcing portion 31A extending downward from the upper side of the outer circumferential portion of the yoke 31 as well as the magnetic pole "S" at the other end of the outer circumferential portion of the yoke 31. On the other hand, there is always generated a magnetic line of force M2 passing the yoke 31 from the inductor 33 toward the inductor 35 by the permanent magnet 34 forming the mover 39.

Similarly to the first embodiment, since the directions of these magnetic lines of force M1 and M2 are same, these magnetic lines of force M1 and M2 are superimposed each other and thus a strong "N" pole is generated at the bottom end of the magnetic reinforcing portion 31A.

The strong "N" pole generated at the bottom end of the magnetic reinforcing portion 31A strongly attracts the "S" pole near the inductor 35 and simultaneously repulses strongly the "N" pole near the inductor 33. On the other hand, the "S" pole generated at the other end of the yoke 31 attracts the "N" pole near the inductor 37 and simultaneously repulses the "S" pole near the inductor 35. The mover 39 is thus moved upward in FIG. 6 by these attractive forces and the repulsive forces with a large force F1 and occupies a position of FIG. 7.

In the condition of FIG. 7, when a current A2 of a direction reverse to that of the current A1 is supplied to the excitation coil 32, a magnetic line of force M3 is generated in the yoke 31 of the stator 38. This magnetic line of force M3 generates the magnetic pole "S" at the bottom end of the magnetic reinforcing portion 31A extending downward from the upper side of the outer circumferential portion of the yoke 31 as well as the magnetic pole "N" at the other end of the outer circumferential portion of the yoke 31. On the other hand, there is always generated a magnetic line of force M4, substantially same as the magnetic line of force M2, passing the yoke 31 from the inductor 33 toward the inductor 35 by the permanent magnet 34 forming the mover 39.

Similarly to the first embodiment, since the directions of these magnetic lines of force M3 and M4 are opposite to each other, these magnetic lines of force M3 and M4 are cancelled out each other and thus a weak "S" pole is generated at the bottom end of the magnetic reinforcing portion 31A.

The weak "S" pole generated at the bottom end of the magnetic reinforcing portion 31A weakly repulses the "S" pole near the inductor 35 and simultaneously attracts weakly the "N" pole near the inductor 33. On the other hand, the "N" pole generated at the other end of the yoke 31 repulses the "N" pole near the inductor 37 and simultaneously attracts the "S" pole near the inductor 35. The mover 39 is thus moved downward in FIG. 7 by these attractive forces and the repulsive forces with a small force F2 and occupies its initial position of FIG. 6.

The upward and downward motions of the mover 39 are thus repeated and the mover 39 continues the oscillation.

As described, the direction of the magnetic line of force is changed in accordance with the direction of the current supplied to the excitation coil 32 and is influenced by the magnetic line of force generated in the mover 39. As the result of which, one of the attractive and repulsive forces is increased and the other is reduce.

Accordingly, the mover 39 can move in one direction of oscillation (the upward direction in FIGS. 6) with a force larger than in the other direction (the downward direction in FIG. 7).

As can be seen from the description above, the actuator 40 of the fourth embodiment has a simple structure comprising one excitation coil 32 and can be easily assembled by arranging two permanent magnets 34 and 36 opposed to the magnetic reinforcing portion 31A extending from the top end of the yoke 31.

Since the presence of the magnetic reinforcing portion 31A makes the configuration of the outer circumferential surface of the yoke 31 nonsymmetrical, it is possible to drive the mover 39 with a high thrust only in one direction using a simple input signal such as a square wave or a sine wave.

Accordingly, the actuator 40 of the fourth embodiment has same performance and characteristics as those of the actuator 10 of first embodiment.

The actuator in each embodiment of the present invention can be effectively used in mechanical instruments (e.g. an air compressor, a reciprocal pump, a respirator, a blood pump for an artificial heart, etc.) which require a larger force in one direction of reciprocal movements than the other direction.

It will be understood that it is possible to change various characteristics by changing the length and the volume of the magnetic reinforcing portions 1A and 31A, and the length of the gap "G".

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or the equivalents thereof.

What is claimed is:

1. A linear oscillatory actuator, comprising:
   a yoke formed of magnetic material and having an asymmetric outer circumferential surface;
   an excitation coil wound on the yoke; and
   two permanent ring-shaped magnets arranged around the yoke and integrably set face-to-face on a common magnetic pole along an axial direction.

2. The linear oscillatory actuator of claim 1, further comprising:
   a stator constituted by the yoke and the excitation coil; and
   a plurality of inductors configured to hold the two ring-shaped permanent magnets so as to form an integrated mover.

3. The linear oscillatory actuator of claim 1, further comprising:
   a support member arranged around the mover and configured to guide said mover.

4. A linear oscillatory actuator, comprising:
   a yoke formed of magnetic material having a ring configuration with an asymmetric outer circumferential surface;
   an excitation coil wound on the yoke;
   two permanent magnets arranged inside the yoke and integrably set face-to-face on a common magnetic pole along an axial direction; and
   a magnetic reinforcing portion extending from one end of the yoke and arranged opposed to the two permanent magnets.

5. The linear oscillatory actuator of claim 4, further comprising:
   a stator constituted by the yoke and the excitation coil; and
   a plurality of inductors configured to hold the two permanent magnets so as to form an integrated mover.

6. A linear oscillatory actuator, comprising:
   a yoke formed of magnetic material and having an asymmetric outer circumferential surface;
   an excitation coil wound on the yoke;
   two permanent ring magnets arranged around the yoke and integrably set face-to-face on a common magnetic pole along an axial direction; and
   a magnetic reinforcing portion extending from one end of the yoke and arranged opposed to the two permanent ring magnets.

7. The linear oscillatory actuator of claim 6, further comprising:
   a stator constituted by the yoke and the excitation coil; and
   a plurality of inductors configured to hold the two permanent ring magnets so as the form an integrated mover.

8. The linear oscillatory actuator of claim 6, further comprising:
   a support member arranged around the mover and configured to guide said mover.

* * * * *